United States Patent
Yamada et al.

(10) Patent No.: US 8,675,308 B2
(45) Date of Patent: Mar. 18, 2014

(54) MAGNETIC RECORDING HEAD WITH HIGH FREQUENCY OSCILLATOR AND DISK DRIVE WITH THE SAME

(71) Applicant: Kabushiki Kaisha Toshiba, Tokyo (JP)

(72) Inventors: Kenichiro Yamada, Tokyo (JP); Takuya Matsumoto, Tokyo (JP); Naoyuki Narita, Fuchu (JP); Tomoko Taguchi, Kunitachi (JP); Katsuhiko Koui, Yokohama (JP); Akihiko Takeo, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/680,363

(22) Filed: Nov. 19, 2012

(65) Prior Publication Data

US 2014/0002924 A1    Jan. 2, 2014

(30) Foreign Application Priority Data

Jun. 29, 2012   (JP) .................................. 2012-146891

(51) Int. Cl.
    *G11B 5/127* (2006.01)
(52) U.S. Cl.
    USPC ...................................................... 360/125.3
(58) Field of Classification Search
    USPC .................................. 360/125.3, 125.71, 128
    See application file for complete search history.

(56) References Cited

U.S. PATENT DOCUMENTS

| | | | |
|---|---|---|---|
| 7,724,469 B2 * | 5/2010 | Gao et al. .................... | 360/125.3 |
| 7,957,098 B2 | 6/2011 | Yamada et al. | |
| 8,081,397 B2 | 12/2011 | Funayama et al. | |
| 8,139,322 B2 * | 3/2012 | Yamada et al. ............ | 360/125.3 |
| 8,164,854 B2 * | 4/2012 | Takagishi et al. ......... | 360/125.31 |
| 8,238,060 B2 | 8/2012 | Yamada et al. | |
| 8,270,112 B2 * | 9/2012 | Funayama et al. ....... | 360/125.31 |
| 8,295,009 B2 | 10/2012 | Yamada et al. | |
| 8,400,734 B2 * | 3/2013 | Yamada et al. ............ | 360/125.3 |
| 2002/0051330 A1 * | 5/2002 | Heijden et al. ................ | 360/324 |
| 2008/0137224 A1 * | 6/2008 | Gao et al. ......................... | 360/55 |
| 2008/0218891 A1 * | 9/2008 | Gubbins et al. ................ | 360/59 |
| 2009/0052095 A1 | 2/2009 | Yamada et al. | |
| 2009/0316304 A1 | 12/2009 | Funayama et al. | |
| 2010/0007992 A1 * | 1/2010 | Yamada et al. ............... | 360/244 |
| 2010/0134922 A1 * | 6/2010 | Yamada et al. ........... | 360/123.01 |
| 2010/0195247 A1 | 8/2010 | Mochizuki et al. | |
| 2010/0220415 A1 | 9/2010 | Yamada et al. | |
| 2011/0090594 A1 | 4/2011 | Gurney et al. | |
| 2011/0228423 A1 * | 9/2011 | Koui et al. ....................... | 360/75 |
| 2011/0299192 A1 | 12/2011 | Yamada et al. | |
| 2011/0300409 A1 | 12/2011 | Yamada et al. | |
| 2012/0268844 A1 | 10/2012 | Yamada et al. | |

FOREIGN PATENT DOCUMENTS

| | | |
|---|---|---|
| JP | 2009-070541 A | 4/2009 |
| JP | 2010-003353 A | 1/2010 |
| JP | 2010-182361 A | 8/2010 |
| JP | 2011-090765 A | 5/2011 |

* cited by examiner

*Primary Examiner* — Angel Castro
(74) *Attorney, Agent, or Firm* — Knobbe Martens Olson & Bear LLP

(57) ABSTRACT

According to one embodiment, a magnetic recording head includes a disk-facing surface configured to face a recording layer of a recording medium, a main magnetic pole includes a distal end located on the disk-facing surface and configured to apply a recording magnetic field to the recording layer of the recording medium, a leading shield on a leading side of the main magnetic pole, opposed to the distal end of the main magnetic pole across a gap, a high-frequency oscillator between the leading shield and the distal end of the main magnetic pole, and a recording coil configured to excite the main magnetic pole with a magnetic field.

15 Claims, 18 Drawing Sheets

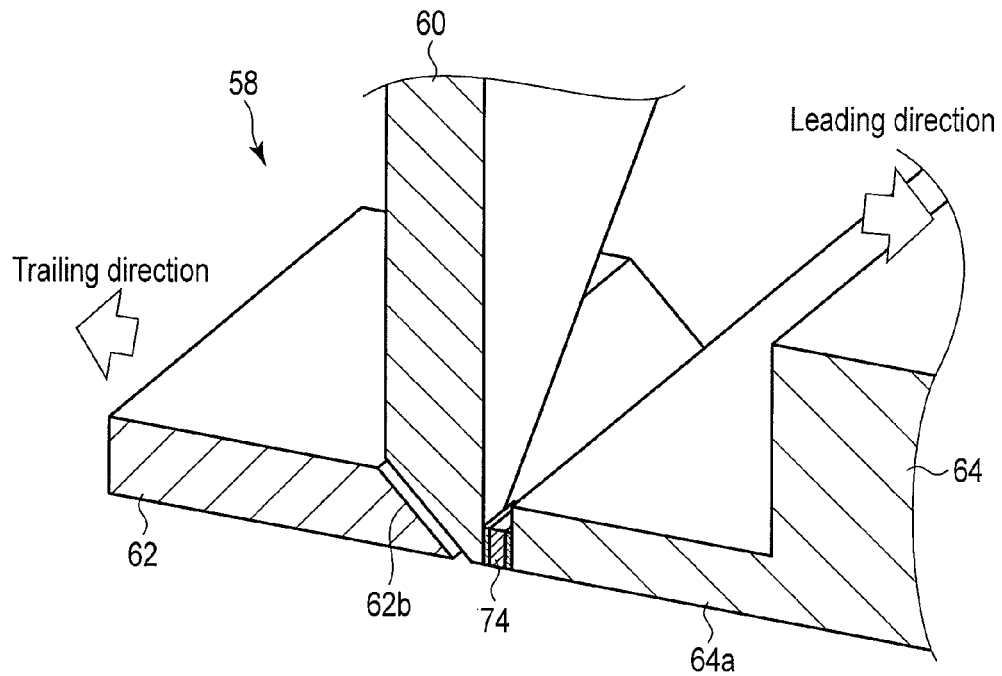
F I G. 5
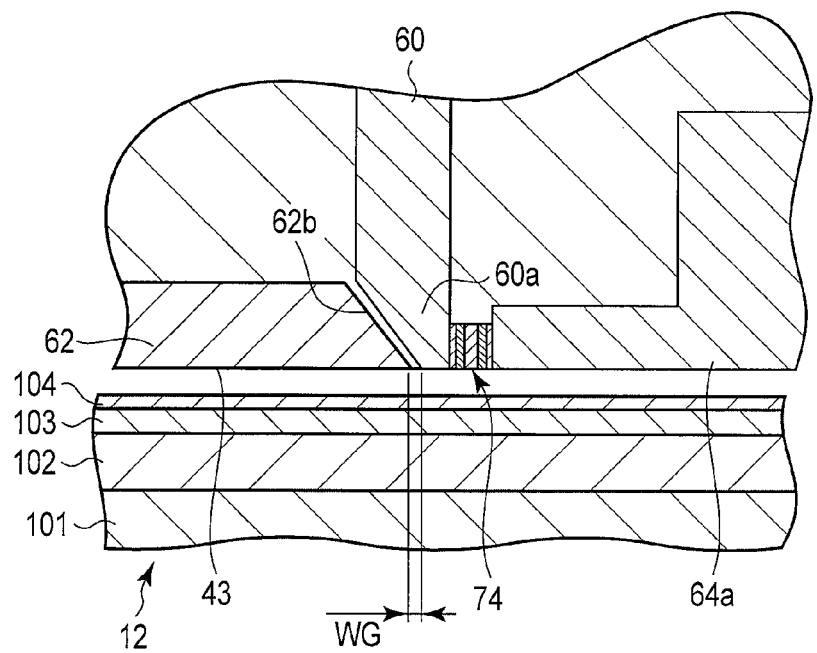
F I G. 6

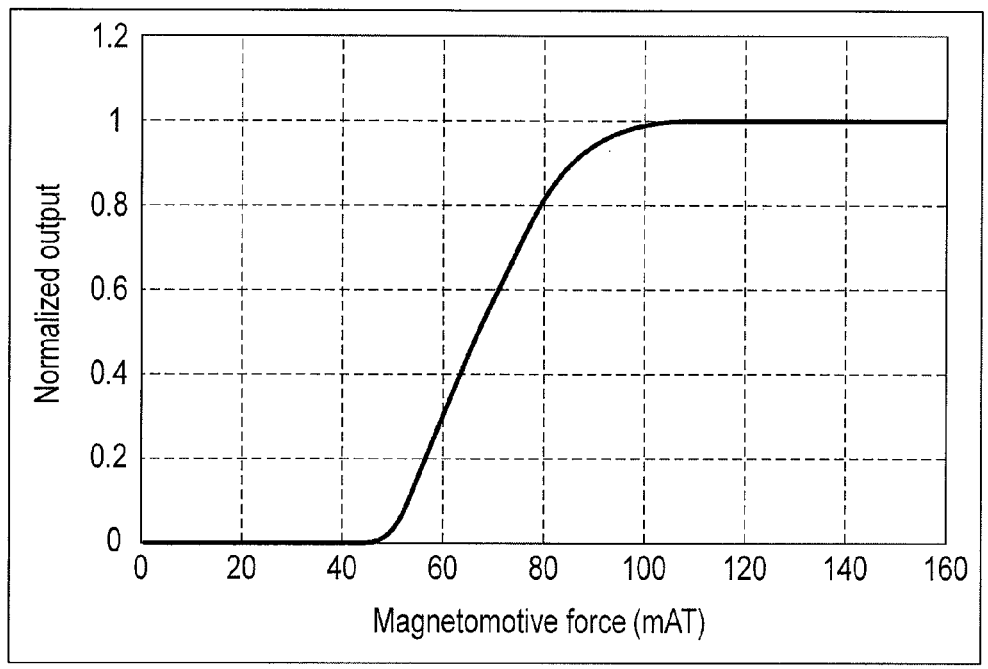
F I G. 9
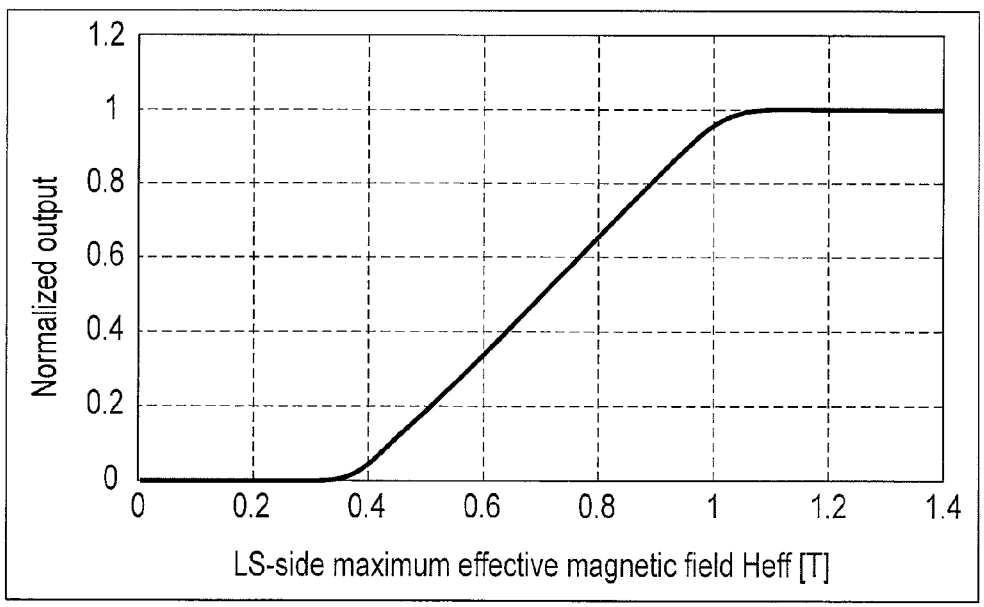
F I G. 10

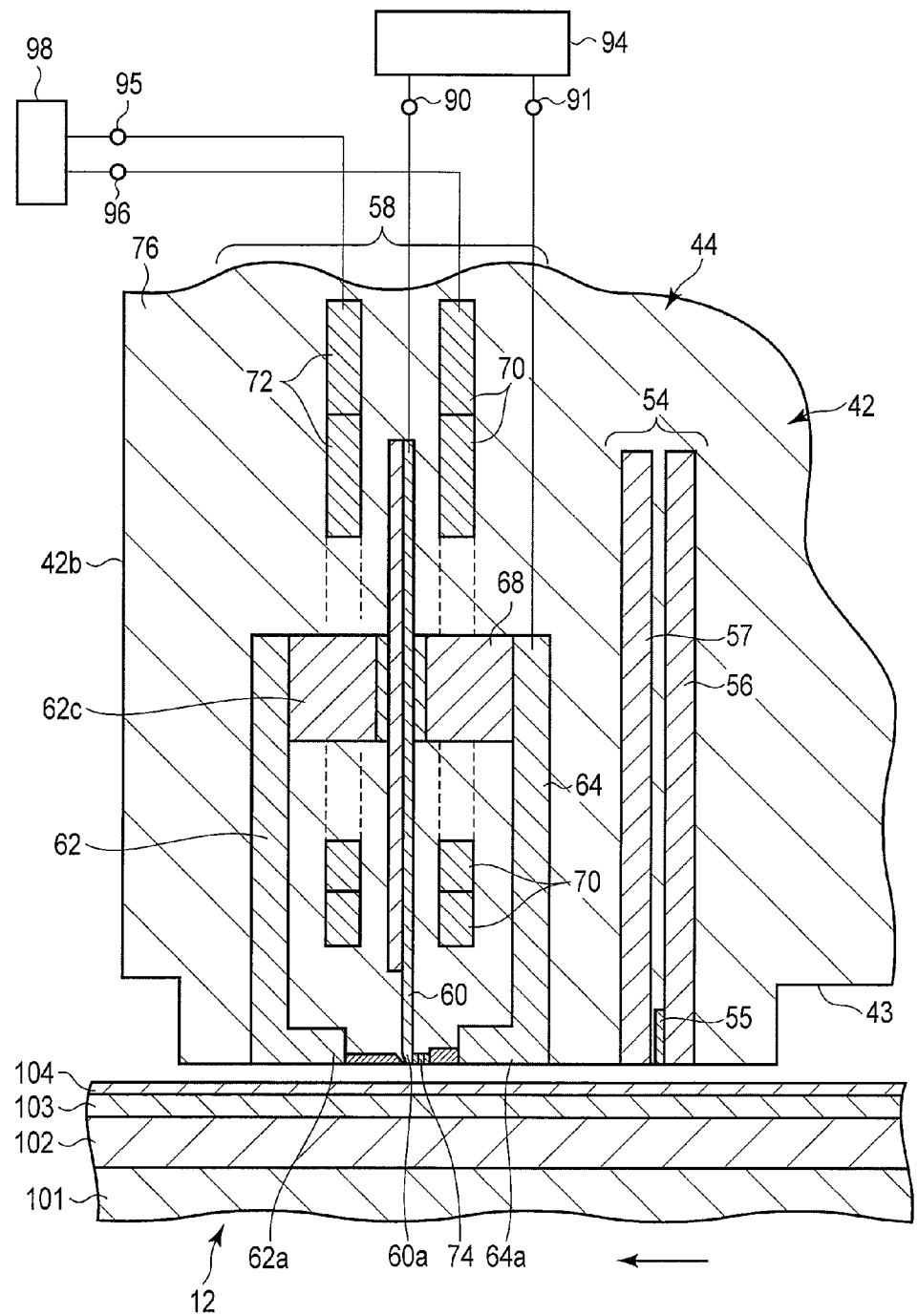
F I G. 13

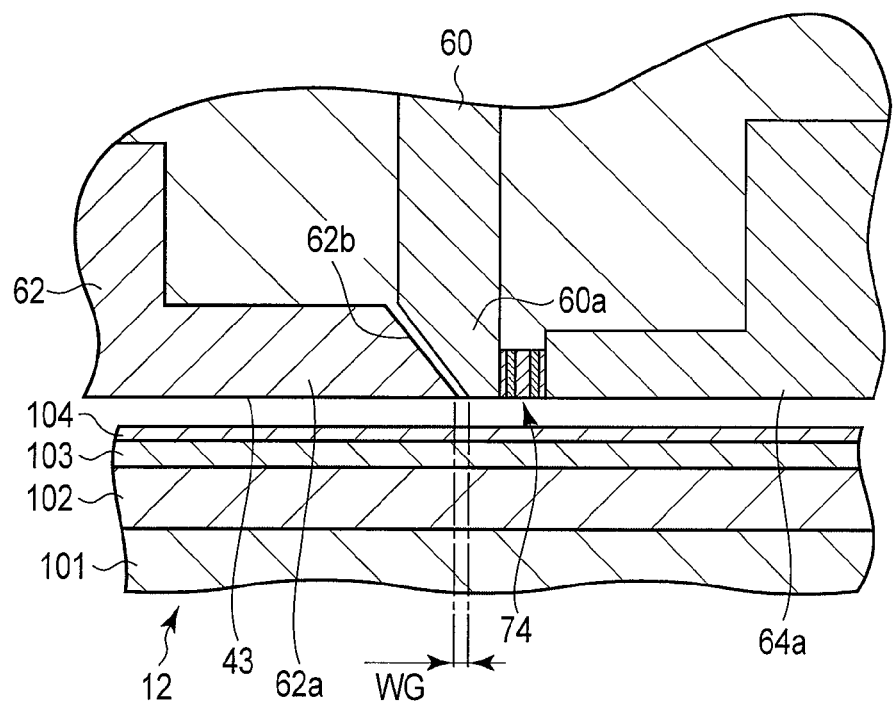
F I G. 14

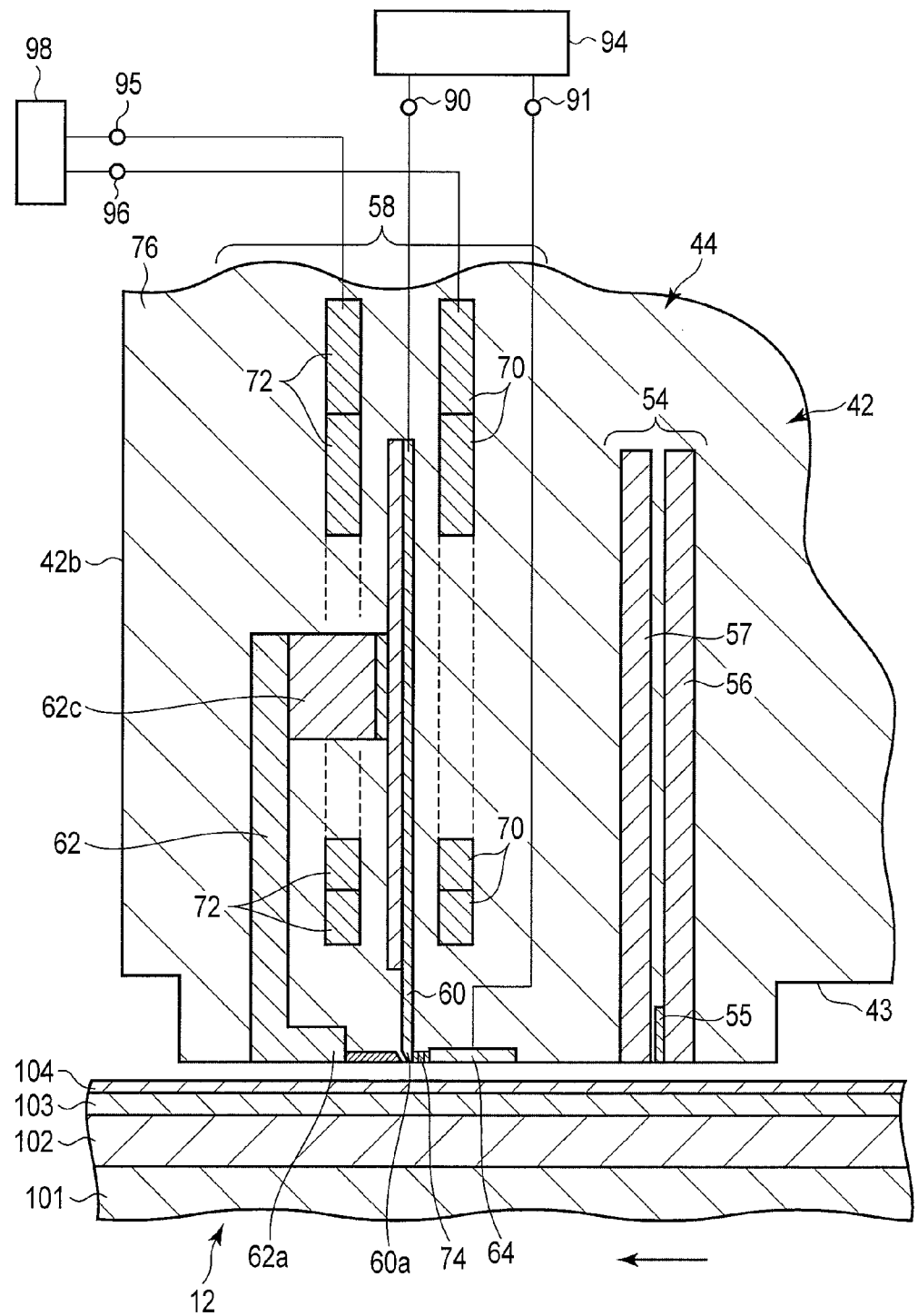
F I G. 17

Trailing direction ← Effective magnetic field Heff    Leading direction →
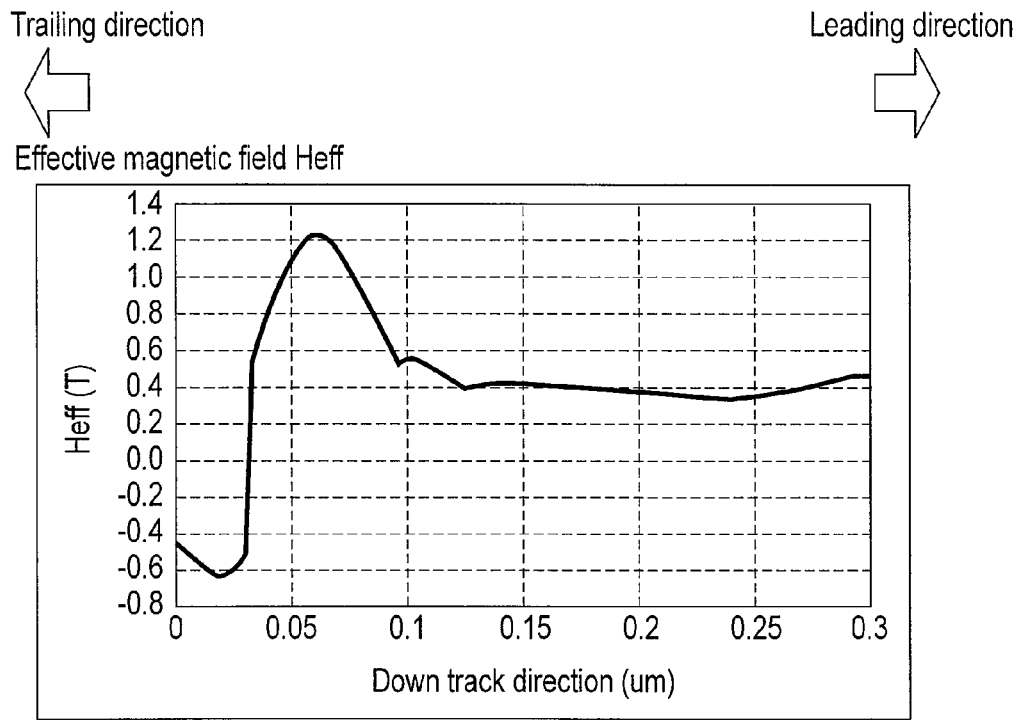
F I G. 19
High-frequency magnetic field c-Hac
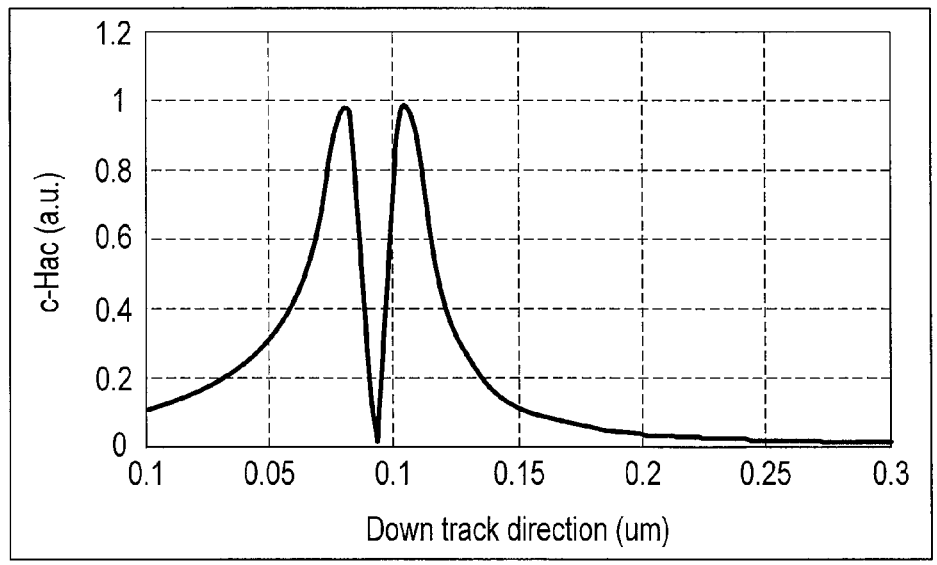
F I G. 20

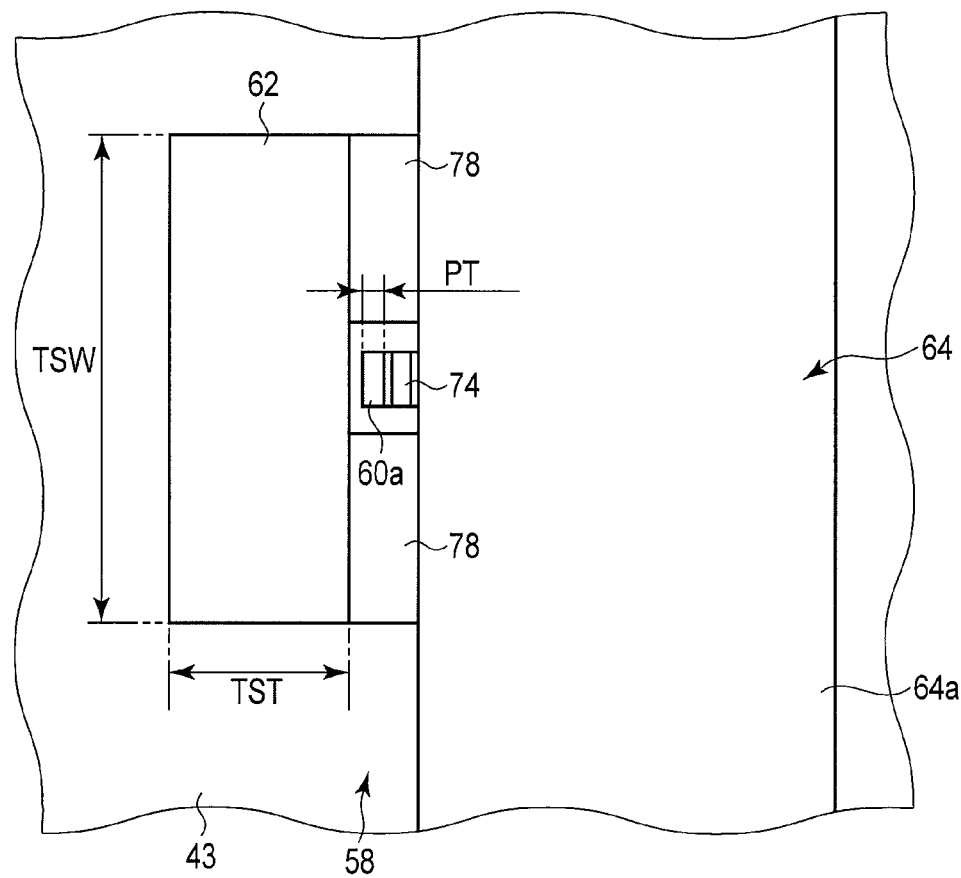
F I G. 23

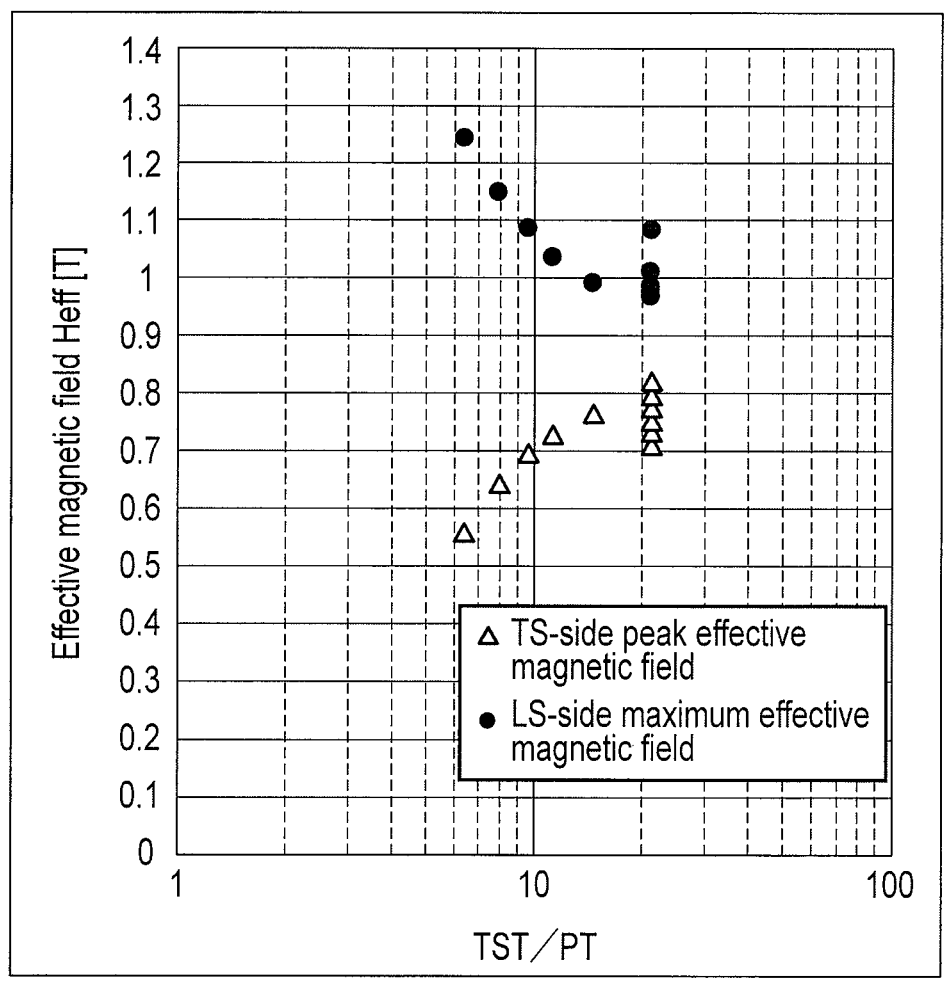
F I G. 24

US 8,675,308 B2

MAGNETIC RECORDING HEAD WITH HIGH FREQUENCY OSCILLATOR AND DISK DRIVE WITH THE SAME

CROSS-REFERENCE TO RELATED APPLICATIONS

This application is based upon and claims the benefit of priority from Japanese Patent Application No. 2012-146891, filed Jun. 29, 2012, the entire contents of which are incorporated herein by reference.

FIELD

Embodiments described herein relate generally to a magnetic recording head having a high-frequency oscillator, and a disk drive comprising the magnetic recording head.

BACKGROUND

As a disk drive, for example, a magnetic disk drive comprises a magnetic disk disposed in a case, spindle motor which supports and rotates the magnetic disk, a magnetic head which reads information from and writes information into the magnetic disk, and a carriage assembly which supports the magnetic head movably relative to the magnetic disk. The magnetic head has a slider attached to a suspension, and a head portion provided in the slider. The head portion comprises a recording head and a reproducing head.

Recently, a perpendicular magnetic recording magnetic head has been suggested for higher recording density, higher capacity, or a smaller size of a magnetic disk drive. In such a magnetic head, the recording head has a main magnetic pole which generates a perpendicular magnetic field, a trailing shield located on the trailing side of the main magnetic pole across a write gap to close a magnetic path between this trailing shield and the magnetic path, and a coil for passing a magnetic flux through the main magnetic pole. A high-frequency assist head has been suggested. In this high-frequency assist head, a high-frequency oscillator is provided between a medium-side end of a trailing shield and a main magnetic pole, and a current is passed to the high-frequency oscillator through the main magnetic pole and the trailing shield.

In the high-frequency assist recording head, the high-frequency oscillator is located between the main magnetic pole and the trailing shield which is located on the trailing side of the main magnetic pole, that is, the high-frequency oscillator is located on the trailing side of the main magnetic pole. A drive current is passed through this high-frequency oscillator, and the magnetization of an oscillating layer is oscillated. As a result, a great high-frequency magnetic field can be generated. Recording ability is improved in a region where the high-frequency magnetic field is superposed on a recording magnetic field coming from the main magnetic pole, and stable recording characteristics are obtained.

Increased intensity of high-frequency magnetic field is required for enhanced high-frequency recording. In this case, the high-frequency magnetic field generated on the trailing side of the main magnetic pole is also increased, and recorded bits may be reversed in the region where the high-frequency magnetic field is superposed on an effective magnetic field coming from the trailing-side end.

BRIEF DESCRIPTION OF THE DRAWINGS

FIG. 5 is an enlarged perspective view showing a disk-side end of the recording head;
FIG. 6 is an enlarged sectional view showing the disk-side end of the recording head;
FIG. 9 is a graph showing the relationship between magnetomotive force and a normalized output;
FIG. 10 is a graph showing the relationship between a leading-shield (LS)-side maximum effective magnetic field Heff generated by the main magnetic pole and the normalized output;
FIG. 13 is a sectional view showing a head portion of a magnetic head of an HDD according to a second embodiment;
FIG. 14 is an enlarged sectional view showing the magnetic-disk-side end of a magnetic recording head according to the second embodiment;
FIG. 17 is a sectional view showing a head portion of a magnetic head of an HDD according to a third embodiment;
FIG. 19 is a graph showing the distribution of an effective magnetic field of the magnetic recording head in the down track direction;
FIG. 20 is a graph showing a down-track-direction distribution of a high-frequency magnetic field c-Hac generated from a spin torque oscillator.

FIG. 23 is a plan view showing a head portion of a magnetic head of an HDD according to a fifth embodiment from the side of a disk-facing surface; and FIG. 24 is a graph showing the relationship between the ratio (TSW/PT) of the length TSW of a trailing shield of a recording head according to the fifth embodiment in a core width direction to the length PT of a main magnetic pole in a down track direction, and an effective magnetic field Heff.

DETAILED DESCRIPTION

Various embodiments will be described hereinafter with reference to the accompanying drawings. In general, according to one embodiment, a magnetic recording head comprises: a disk-facing surface configured to face a recording layer of a recording medium; a main magnetic pole comprising a distal end located on the disk-facing surface and configured to apply a recording magnetic field to the recording layer of the recording medium; a leading shield on a leading side of the main magnetic pole, opposed to the distal end of the main magnetic pole across a gap; a high-frequency oscillator between the leading shield and the distal end of the main magnetic pole; and a recording coil configured to excite the main magnetic pole with a magnetic field.

(First Embodiment)

Figure 1:
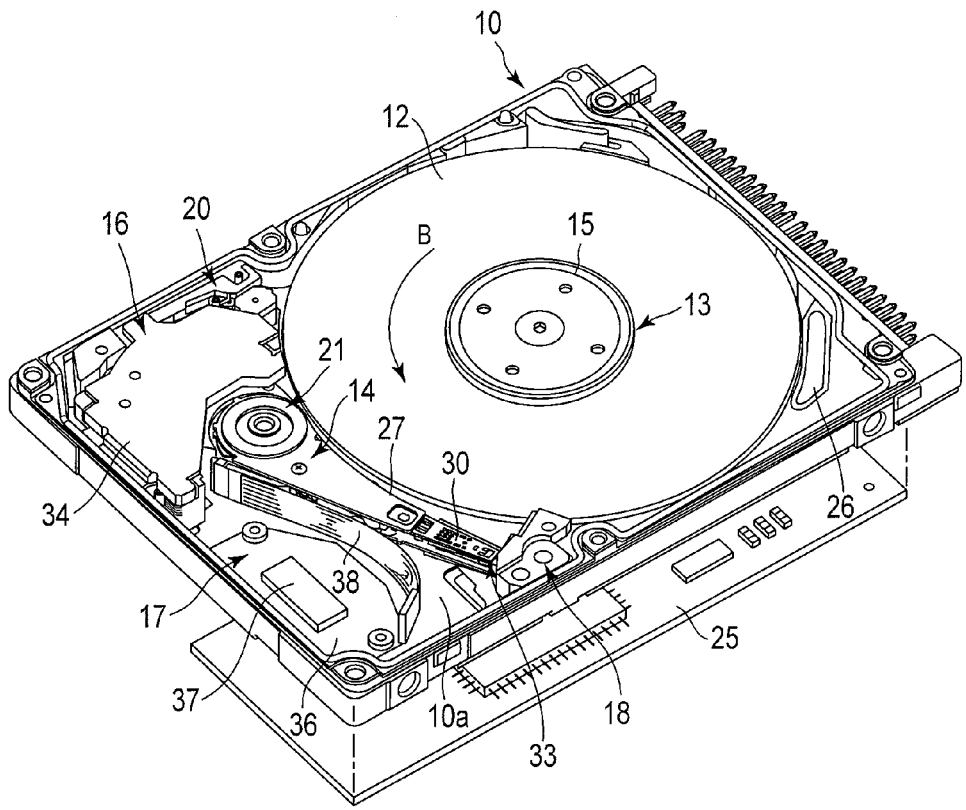
FIG. 1 is a perspective view showing a hard disk drive (hereinafter, an HDD) according to a first embodiment.
Figure 2:
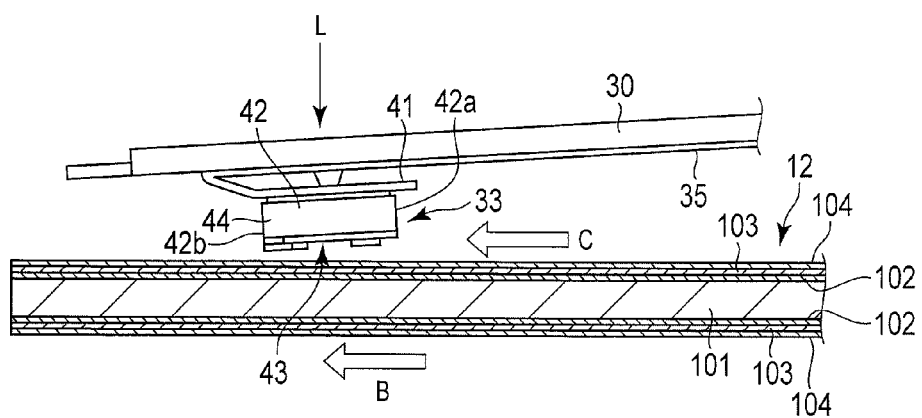
FIG. 2 is a side view showing a magnetic head and a suspension in the HDD.

FIG. 1 shows the internal structure of an HDD according to a first embodiment without a top cover. FIG. 2 shows a magnetic head in a floating state. As shown in FIG. 1, the HDD comprises a housing 10. This housing 10 comprises a rectangular box-shaped base 10a having an open top, and an unshown rectangular plate-shaped top cover. The top cover is screwed to the base with a plurality of screws, and closes the upper end opening of the base. Thus, the inside of the housing 10 is kept airtight, and is only allowed to let in or out air through a breathing filter 26.

A magnetic disk 12 as a recording medium and a mechanical unit (drive unit) are provided on the base 10a. The mechanical unit comprises a spindle motor 13 which supports and rotates the magnetic disk 12, a plurality of, for example, two magnetic heads 33 which record information in the magnetic disk or reproduce information from the magnetic disk, a head actuator 14 which supports the magnetic heads 33 movably relative to the surface of the magnetic disk 12, and a voice coil motor (hereinafter referred to as a VCM) 16 which rotates and positions the head actuator. Moreover, a ramp load mechanism 18, a latch mechanism 20, and a substrate unit 17 are provided on the base 10a. The ramp load mechanism 18 holds the magnetic heads 33 at a distance from the magnetic disk 12 when the magnetic heads 33 have moved to the outer circumference of the magnetic disk 12. The latch mechanism 20 holds the head actuator 14 at a refuge position when, for example, an impact is caused to the HDD. Electronic components such as a preamplifier and a head IC are mounted on the substrate unit 17.

A control circuit substrate 25 is screwed to the outer surface of the base 10a, and is located to face the bottom wall of the base 10a. The control circuit substrate 25 controls the operations of the spindle motor 13, the VCM 16, and the magnetic heads 33 via the substrate unit 17.

As shown in FIG. 1, the magnetic disk 12 is clamped by a clamp spring 15, and fixed to a hub of the spindle motor 13. The clamp spring 15 is coaxially fitted on the hub, and is screwed to the upper end of the hub. The magnetic disk 12 is rotationally driven at a predetermined velocity in an arrow B direction by the spindle motor 13 as a drive motor.

The head actuator 14 comprises a bearing 21 fixed to the bottom wall of the base 10a, and a plurality of arms 27 extending from the bearing 21. The arms 27 are located parallel to the surface of the magnetic disk 12 and located a predetermine distance apart from each other. The arms 27 extend from the bearing 21 in the same direction. The head actuator 14 comprises elastically deformable elongated plate-like suspensions 30. The suspension 30 comprises a leaf spring. The proximal end of the suspension 30 is fixed to the distal end of the arm 27 by spot welding or adhesive bonding, and extends from the arm. Each of the suspensions 30 may be formed integrally with the corresponding arm 27. The magnetic heads 33 are supported on the extending ends of the respective suspensions 30. The arm 27 and the suspension 30 constitute a head suspension. This head suspension and the magnetic heads 33 constitute a head suspension assembly.

As shown in FIG. 2, each of the magnetic heads 33 has a slider 42 which is substantially in the shape of a rectangular parallelepiped, and a recording/reproduction head portion 44 provided at an outflow end (trailing end) of the slider 42. The magnetic head 33 is fixed to a gimbal spring provided at the distal end of the suspension 30. A head load L toward the surface of the magnetic disk 12 is applied to each of the magnetic heads 33 by the elasticity of the suspension 30. Two arms 27 are located a predetermined distance apart from each other and parallel to each other. The suspension 30 and the magnetic head 33 that are attached to these arms face each other across the magnetic disk 12.

Each of the magnetic heads 33 is electrically connected to a later-described main FPC 38 via a relay flexible printed circuit board (hereinafter referred to as a relay FPC) 35 fixed to the suspension 30 and the arm 27.

As shown in FIG. 1, the substrate unit 17 has an FPC main unit 36 formed by a flexible printed circuit board, and the main FPC 38 extending from the FPC main unit. The FPC main unit 36 is fixed to the bottom surface of the base 10a. Electronic components such as a preamplifier 37 and a head IC are mounted on the FPC main unit 36. The extending end of the main FPC 38 is connected to the head actuator 14, and connected to the magnetic head 33 via each relay FPC 35.

The VCM 16 has an unshown support frame extending from the bearing 21 in a direction opposite to the arm 27, and a voice coil supported by the support frame. When the head actuator 14 is incorporated in the base 10a, the voice coil is located between a pair of yokes 34 fixed to the base 10a, and constitute the VCM 16 together with the yokes and magnets fixed to the yokes.

Electricity is passed through the voice coil of the VCM 16 while the magnetic disk 12 is rotating. As a result, the head actuator 14 rotates, and the magnetic heads 33 are moved to and positioned on a desired track of the magnetic disk 12. In this case, the magnetic heads 33 are moved between the inner peripheral edge and outer peripheral edge of the magnetic disk along the diametrical direction of the magnetic disk 12.

Figure 3:
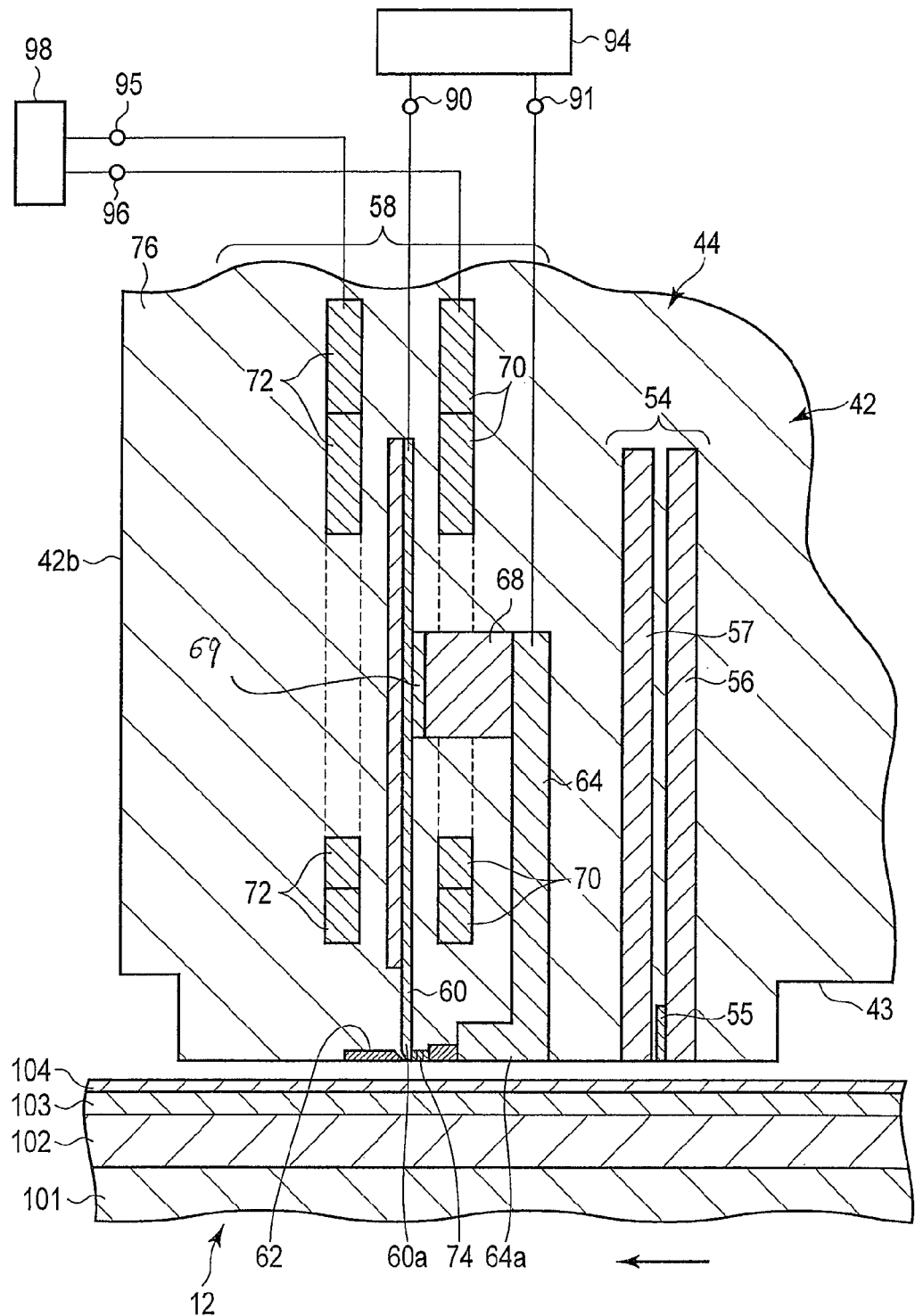
FIG. 3 is an enlarged sectional view showing a head portion of the magnetic head.

Now, the configurations of the magnetic disk 12 and the magnetic head 33 are described in detail. FIG. 3 is an enlarged sectional view showing the head portion 44 of the magnetic head 33 and the magnetic disk.

As shown in FIG. 1 to FIG. 3, the magnetic disk 12 has a disk-shaped nonmagnetic substrate 101, for example, having a diameter of about 2.5 inches. A soft magnetic layer 102, a magnetic recording layer 103, and a protective film layer 104 are stacked in order on the surface of the substrate 101. The soft magnetic layer 102 as a foundation layer is made of a material that shows soft magnetic properties. The magnetic recording layer 103 has magnetic anisotropy perpendicular to the disk surface.

As shown in FIG. 2 and FIG. 3, the magnetic head 33 comprises a floating-type head, and has the slider 42 which is substantially in the shape of a rectangular parallelepiped, and the head portion 44 provided at the distal end of the outflow (trailing) end of the slider. The slider 42 is made of, for example, a sintered compact (AlTiC) of alumina and titanium carbide. The head portion 44 is formed by stacking thin films.

The slider 42 has a rectangular disk-facing surface (air bearing surface (ABS)) 43 that faces the surface of the magnetic disk 12. The slider 42 floats in response to airflow C produced between the disk surface and the disk-facing surface 43 by the rotation of the magnetic disk 12. The direction of the airflow C corresponds to a rotation direction B of the magnetic disk 12. The slider 42 is located relative to the surface of the magnetic disk 12 so that the longitudinal direction of the disk-facing surface 43 substantially corresponds to the direction of the airflow C.

The slider 42 has a leading end 42a located on the inflow side of the airflow C, and a trailing end 42b located on the outflow side of the airflow C. For example, an unshown leading step, a trailing step, a side step, and a negative pressure cavity are formed on the disk-facing surface 43 of the slider 42.

As shown in FIG. 3, the head portion 44 has a reproduction head 54 and a magnetic recording head 58 that are formed at the trailing end 42b of the slider 42 by a thin film process, and is formed as a separated type magnetic head.

The reproduction head 54 comprises a magnetic film 55 showing magnetoresistive effect, and shield films 56 and 57 located on the trailing side and leading side of the magnetic film 55 across the magnetic film 55. The lower ends of the magnetic film 55 and the shield films 56 and 57 are exposed in the disk-facing surface 43 of the slider 42.

Figure 4:
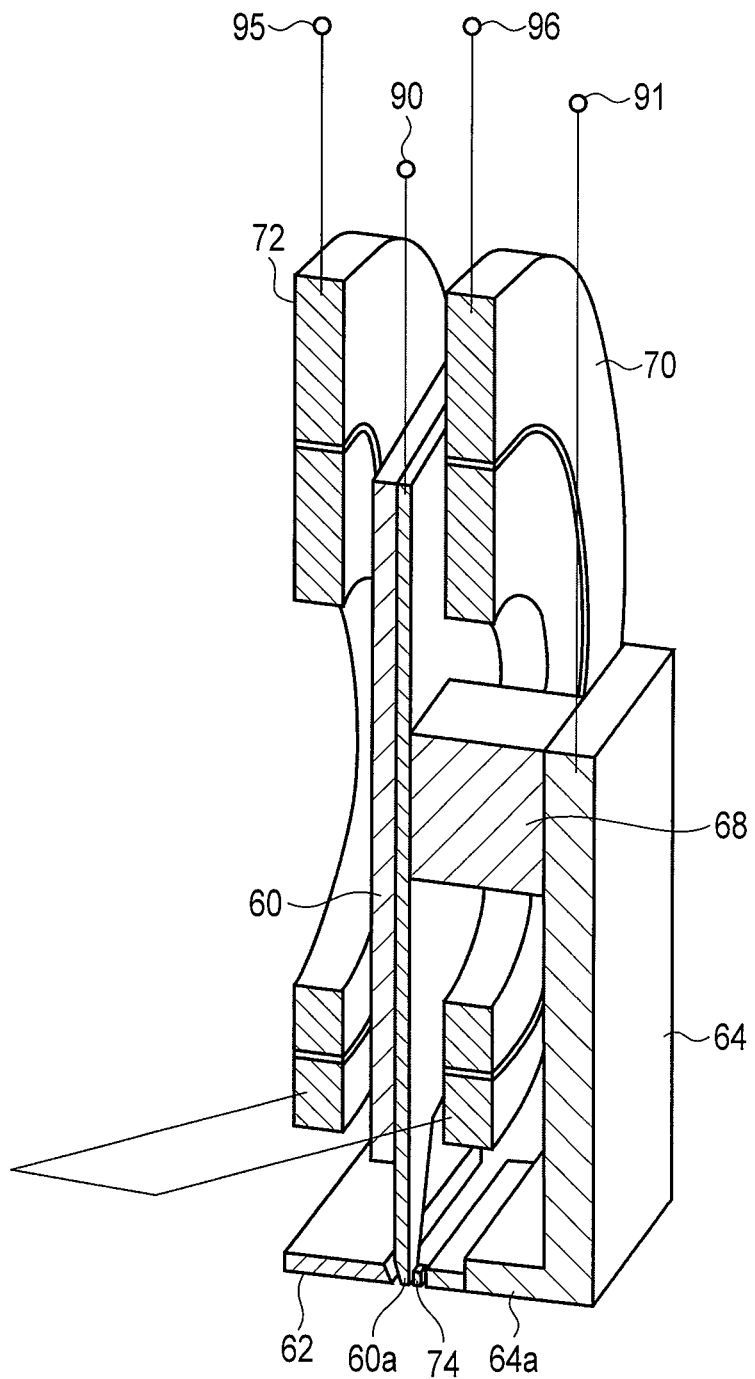
FIG. 4 is a perspective view schematically showing a recording head of the magnetic head.
Figure 7:
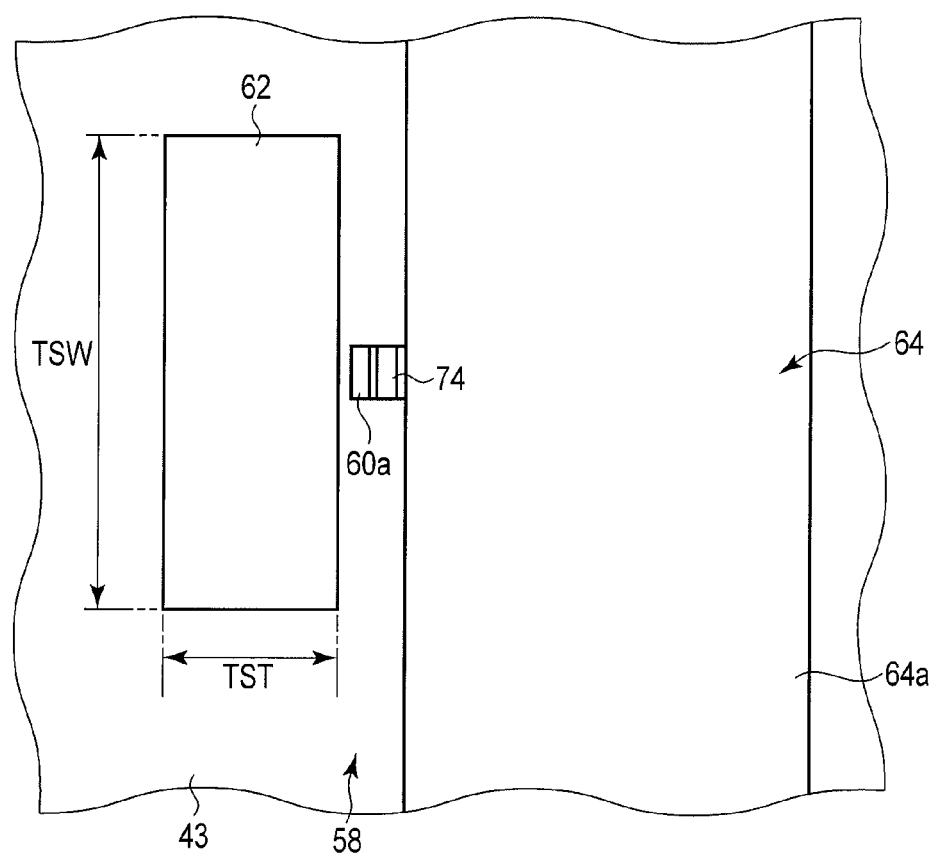
FIG. 7 is a plan view showing the recording head from the side of a disk-facing surface.

The magnetic recording head 58 is provided on the trailing end 42b of the slider 42 as opposed to the reproduction head 54. FIG. 4 is a perspective view schematically showing the magnetic recording head 58 and the magnetic disk 12. FIG. 5 is an enlarged perspective view showing a magnetic-disk-side end of the magnetic recording head 58 broken along a track center. FIG. 6 is an enlarged sectional view showing the magnetic-disk-side end of the magnetic recording head 58. FIG. 7 is a plan view showing the recording head from the side of the disk-facing surface.

As shown in FIG. 3 to FIG. 5, the magnetic recording head 58 has a main magnetic pole 60, a trailing shield 62, and a leading shield 64. The main magnetic pole 60 is made of a high-permeability material that generates a recording magnetic field perpendicular to the surface of the magnetic disk 12. The magnetic recording head 58 constitutes a magnetic core that forms a magnetic path comprising the main magnetic pole 60 and the leading shield 64. The magnetic recording head 58 has a first recording coil 70 wound around the magnetic core, and a second coil 72 provided on the trailing side of the main magnetic pole 60. The magnetic recording head 58 further comprises a high-frequency oscillator, for example, a spin torque oscillator (STO) 74 provided between the distal end of the main magnetic pole 60 and the leading shield 64.

The main magnetic pole 60 extends substantially perpendicularly to the surface of the magnetic disk 12. The main magnetic pole 60 has a distal end 60a located in the vicinity of the disk-facing surface 43, and a top (back gap) located inwardly (upwardly) apart from the disk-facing surface. The distal end 60a of the main magnetic pole 60 is tapered toward the disk surface. The distal end 60a of the main magnetic pole 60 is, for example, trapezoidal or rectangular in section. The distal face of the main magnetic pole 60 is exposed in the disk-facing surface 43 of the slider 42. The width of the distal face of the main magnetic pole 60 substantially corresponds to the width of the track in the magnetic disk 12.

As shown in FIG. 3 to FIG. 5, the leading shield 64 made of a soft magnetic body is provided to face the main magnetic pole on the leading side of the main magnetic pole 60. The leading shield 64 is substantially L-shaped, and a distal end 64a on the side of the magnetic disk 12 has an elongated rectangular shape. The distal face (lower end face) of the distal end 64a is exposed in the disk-facing surface 43 of the slider 42. A trailing side end face 64b of the distal end 64a extends in the width direction of the track of the magnetic disk 12. This trailing side end face 64b faces the leading side end face of the main magnetic pole 60 in parallel across a gap. The spin torque oscillator 74 is provided in this gap.

The leading shield 64 has a first connecting portion 68 joined to the back gap of the main magnetic pole 60 at a distance from the magnetic disk 12. The first connecting portion 68 is joined to the main magnetic pole 60 via a nonconducting layer 69, and is electrically insulated from the main magnetic pole 60 and the leading shield 64 in the back gap. The first connecting portion 68 is made of, for example, a soft magnetic body. Together with the main magnetic pole 60 and the leading shield 64, the first connecting portion 68 forms the magnetic core that constitutes a magnetic circuit. The recording head 58 has the first recording coil 70. The first recording coil 70 is located to be wound around the magnetic circuit (magnetic core) that includes the main magnetic pole 60 and the leading shield 64. The first recording coil 70 applies a magnetic field to this magnetic circuit. The first recording coil 70 is wound around the first connecting portion 68, for example, between the main magnetic pole 60 and the leading shield 64.

Furthermore, the second recording coil 72 is located on the trailing side of the main magnetic pole 60. A pair of coils comprising the second recording coil 72 and the first recording coil 70 is configured so that the main magnetic pole 60 intervenes in between. Terminals 95 and 96 are connected to the first and second coils 70 and 72, respectively. A power supply 98 is connected to the terminals 95 and 96. The first coil 70 is connected in series to the second coil 72. The control of current supply to the first coil 70 and the second coil 72 may be separated. The current supplied to the first coil 70 and the second coil 72 is controlled by a controller of the HDD.

Electricity is passed through the first and second recording coils 70 and 72. As a result, the main magnetic pole 60 is magnetized, and a recording magnetic field is applied to the magnetic disk 12. It is also possible to have a structure without one of a pair of recording coils. In this case, heat generated by the coil during recording operation is reduced, and the change of recording characteristics caused by the thermal expansion of the main magnetic pole can be inhibited.

The distance of the gap (back gap) between the back gap of the main magnetic pole 60 and the first connecting portion 68 of the leading shield 64 is smaller than the distance between the main magnetic pole 60 and the leading shield 64 in the vicinity of the coil 70. Therefore, an efficient magnetic path is formed between the main magnetic pole 60 and the leading shield 64, and a great recording magnetic field can be generated on the leading side of the main magnetic pole. The main magnetic pole 60 and the leading shield 64 are electrically insulated from each other in the vicinity of the back gap.

The spin torque oscillator 74 is located between the distal end 60a of the main magnetic pole 60 and the distal end of the leading shield 64 in the vicinity of the disk-facing surface 43. The spin torque oscillator 74 is configured by stacking, for example, a foundation layer, a spin injection layer, an intermediate layer, an oscillating layer, and a gap layer in order from the main magnetic pole 60 to the leading shield 64.

Terminals 90 and 91 are connected to the main magnetic pole 60 and the leading shield 64. The terminals 90 and 91 are connected to a power supply 94. A current circuit is configured so that a drive current can be passed in series through the main magnetic pole 60, the spin torque oscillator 74, and the leading shield 64 from the power supply 94. Electricity is passed through the spin torque oscillator 74, and a high-frequency magnetic field is thereby applied to the recording layer of the magnetic disk 12 from the spin torque oscillator.

As shown in FIG. 3 to FIG. 7, the trailing shield 62 made of a soft magnetic body is located on the trailing side of the main magnetic pole 60. The trailing shield 62 is substantially rectangular, and its distal end is exposed in the disk-facing surface 43. A leading side end face 62b of the trailing shield 62 extends along the width direction of the track of the magnetic disk 12. This leading side end face 62b faces the trailing side end face of the main magnetic pole distal end 60a in parallel across a write gap WG.

Consequently, in the vicinity of the disk-facing surface 43, the leading shield 64, the spin torque oscillator 74, the main magnetic pole 60, and the trailing shield 62 are arranged in the track center in order from the leading side. In the magnetic recording head 58 described above, an alloy containing at least one kind selected from the group consisting of Fe, Co, and Ni or a compound can be selected and used as the soft magnetic body that constitutes the main magnetic pole 60, the trailing shield 62, and the leading shield 64.

As shown in FIG. 3, in the reproduction head 54 and the magnetic recording head 58, spaces between the magnetic body and the conductor are filled with an insulating nonmagnetic body 76 such as alumina or silicon oxide except for parts exposed in the disk-facing surface 43 of the slider 42. The insulating nonmagnetic body 76 forms the outer shape of the head portion 44.

In the embodiment, the gap (distance) between the main magnetic pole 60 and the leading shield 64 is formed at 40 nm. The spin torque oscillator 74 having a core width of 40 nm and an element height of 40 nm is inserted in the gap between the main magnetic pole 60 and the leading shield 64. The spin torque oscillator 74 comprises an oscillating layer, an intermediate layer, and a spin injection layer. The oscillating layer is 15 nm in thickness, and is made of FeCoNi which is nonmagnetic and which has a high saturation flux density of 2T. The intermediate layer is 3 nm in thickness, and is made of Cu having a great spin diffusion length. The spin injection layer is 12 nm in thickness, and is made of Co/Ni artificial lattice having high coercive force and high spin polarizability. The spin torque oscillator 74 is electrically conducted to the main magnetic pole 60 and the leading shield 64 via a metal layer such as Ta or Ru having high electric conductivity. Thus, the main magnetic pole 60 and the leading shield 64 can be used to pass the drive current to the spin torque oscillator 74. As a result, a high-frequency magnetic field is applied to the recording medium from the spin torque oscillator 74.

In order to efficiently generate a recording magnetic field from the disk-facing surface 43, the distal end 60a of the main magnetic pole 60 is tapered toward the disk-facing surface 43. That is, the shape of the trailing side of the main magnetic pole 60 is sloped so that a high recording magnetic field can be generated. The shape of the leading side may also be sloped. The size of the main magnetic pole 60 in the disk-facing surface 43 in a core width direction (track width direction) is 50 nm, and the size in a down track direction (track direction) is 30 nm.

As shown in FIG. 7, the shape of the trailing shield 62 is much smaller than the shape of the leading shield 64. For example, the length TST of the trailing shield 62 in the down track direction is 0.5 μm. The length TSW thereof in a cross track direction (track width direction) is 2 μm. The size (height) thereof in a direction perpendicular to the disk-facing surface 43 is 140 μm.

The trailing shield 62 is formed so that the ratio of the length TSW of a part of the trailing shield 62 facing the distal end of the main magnetic pole 60 in the track width direction to the length TST in the down track direction is 5≥TSW/TST≥30.

According to the HDD having the configuration described above, the head actuator 14 is rotated by the driving of the VCM 16, and the magnetic head 33 is moved to and positioned on a desired track of the magnetic disk 12. The magnetic head 33 floats in response to airflow C produced between the disk surface and the disk-facing surface 43 by the rotation of the magnetic disk 12. During the operation of the HDD, the disk-facing surface 43 of the slider 42 faces the disk surface to keep a clearance therebetween. As shown in FIG. 2, the magnetic head 33 floats in a tilted posture so that the magnetic recording head 58 of the head portion 44 is closest to the surface of the magnetic disk 12. In this condition, recorded information is read from the magnetic disk 12 by the reproduction head 54, and information is written into the magnetic disk 12 by the recording head 58.

In the writing of information, as shown in FIG. 3, a direct current is passed through the main magnetic pole 60, the spin torque oscillator 74, and the leading shield 64 from the power supply 94. A high-frequency magnetic field is generated from the spin torque oscillator 74. The high-frequency magnetic field is then applied to the magnetic recording layer 103 of the magnetic disk 12. Moreover, an alternating current is passed through the first coil 70 and the second coil 72 from the power supply 98. As a result, the main magnetic pole 60 is excited by the first and second recording coils 70 and 72, and a perpendicular recording magnetic field is applied to the magnetic recording layer 103 of the magnetic disk 12 immediately under the main magnetic pole 60 from the main magnetic pole 60. In this way, information is recorded in the magnetic recording layer 103 with a desired track width. Magnetic recording with high coercive force and high magnetic anisotropy energy can be performed by the superposition of the high-frequency magnetic field on the recording magnetic field. Moreover, a current is passed from the main magnetic pole 60 to the leading shield 64 or from the leading shield 64 to the main magnetic pole 60. As a result, the disturbance of a magnetic domain in the main magnetic pole 60 is eliminated, an efficient magnetic path can be derived, and a stronger magnetic field is generated from the distal end of the main magnetic pole.

Figure 8A:
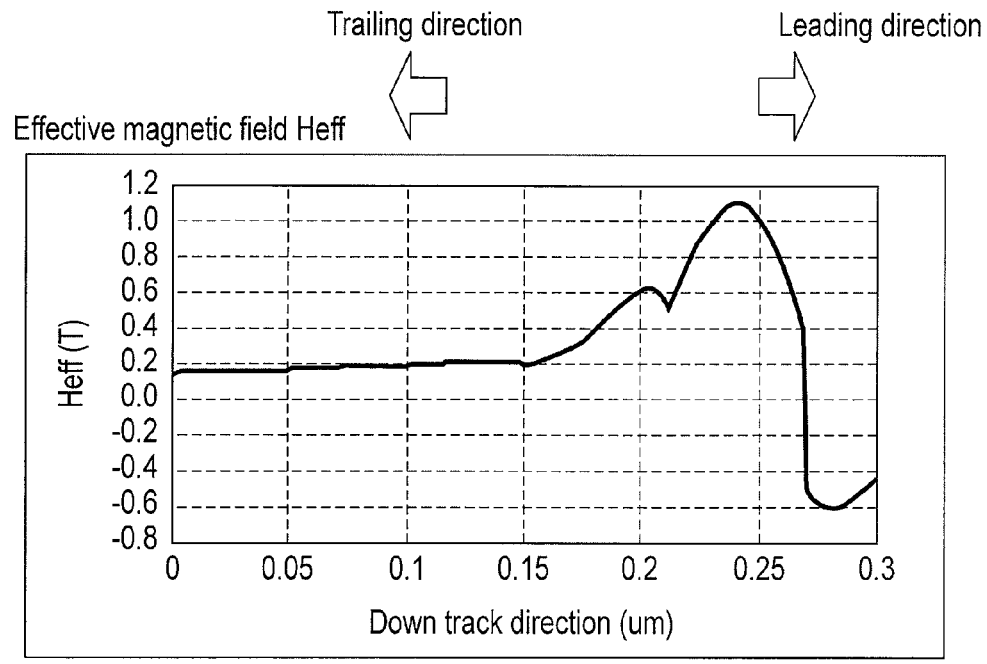
FIG. 8A is a graph showing a down-track-direction distribution of an effective magnetic field Heff which is generated from a main magnetic pole 60 and which is effective in the reversal of a recording medium.
Figure 8B:
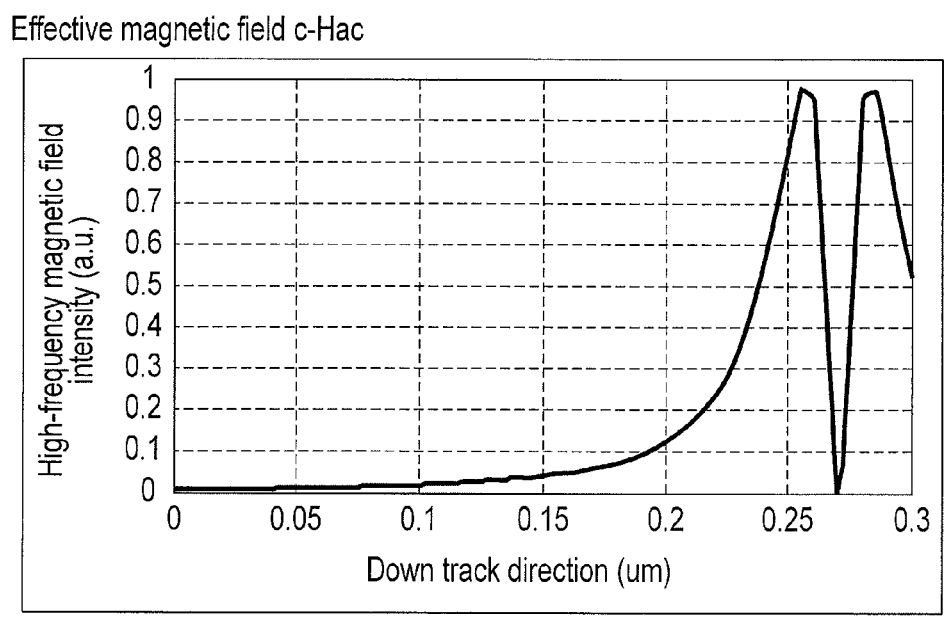
FIG. 8B is a graph showing a down-track-direction distribution of a high-frequency magnetic field c-Hac generated from a spin torque oscillator.

FIG. 8A shows a down-track-direction distribution of an effective magnetic field Heff which is generated from the main magnetic pole 60 and which is effective in the reversal of a recording medium. FIG. 8B shows a down-track-direction distribution of a high-frequency magnetic field c-Hac generated from the spin torque oscillator 74. Here, the effective magnetic field Heff uses $Heff(=|H|\times(\cos 2/3\phi+\sin 2/3\phi)3/2)$, wherein the intensity of a magnetic field from the main magnetic pole 60 and the angle φ of a magnetic field perpendicular to a medium surface are used. The positive and negative signs correspond to the directions of a component of the magnetic field from the main magnetic pole perpendicular to the medium surface. The high-frequency magnetic field c-Hac corresponds to the intensity in a surface parallel to the medium surface. Here, a magnetomotive force of 120 mAT is applied by the first and second recording coils.

A position at 0.2 μm in the down track direction in FIG. 8A and FIG. 8B corresponds to the trailing end of the main magnetic pole 60. A position at 0.23 μm corresponds to the leading end of the main magnetic pole 60. The maximum value of the effective magnetic field Heff is 1.16 T. In the place on the side of the leading shield 64 where the effective magnetic field is maximized, the high-frequency magnetic field c-Hac generated by the spin torque oscillator 74 is sufficiently great, and the recording medium is sufficiently saturated by high-frequency assist recording. A low peak appears at the trailing end of the main magnetic pole 60. The intensity of the effective magnetic field Heff is 0.62 T, and is sufficiently lower than a switch start magnetic field Hm of the recording medium. At a position corresponding to the abovementioned low peak, the intensity of the high-frequency magnetic field c-Hac is so low that no high-frequency assist effect emerges.

FIG. 9 shows the relationship between the magnetomotive force and a normalized output. As shown in the graph, the normalized output is an output that is normalized by a reproduction output whereby the recording medium is saturated. When the magnetomotive force is 100 mAT or more, the maximum value of the effective magnetic field Heff is sufficiently high, and recorded bits are sufficiently saturated. As the effective magnetic field with a low peak on the trailing side is also sufficiently low, the saturated recorded bits are not disturbed, and stable recording is possible.

FIG. 10 shows the relationship between the leading-shield (LS)-side maximum effective magnetic field Heff generated by the main magnetic pole 60 and the normalized output. It is to be noted that a trailing-shield (TS)-side peak effective magnetic field is set at 0.6 T or less so that bits recorded on the LS-side are not disturbed. The normalized output increases with the increase of the LS-side maximum effective magnetic field Heff. When the LS-side maximum effective magnetic field is 1.1 T or more, the output is saturated, and stable recording is possible. Even when the effective magnetic field Heff is slightly smaller than a saturation magnetic field obtained by an MH curve of the recording medium as a result of the high-frequency magnetic field from the spin torque oscillator 74, the recorded bits of the recording medium are saturated, and stable recording is possible.

Figure 11:
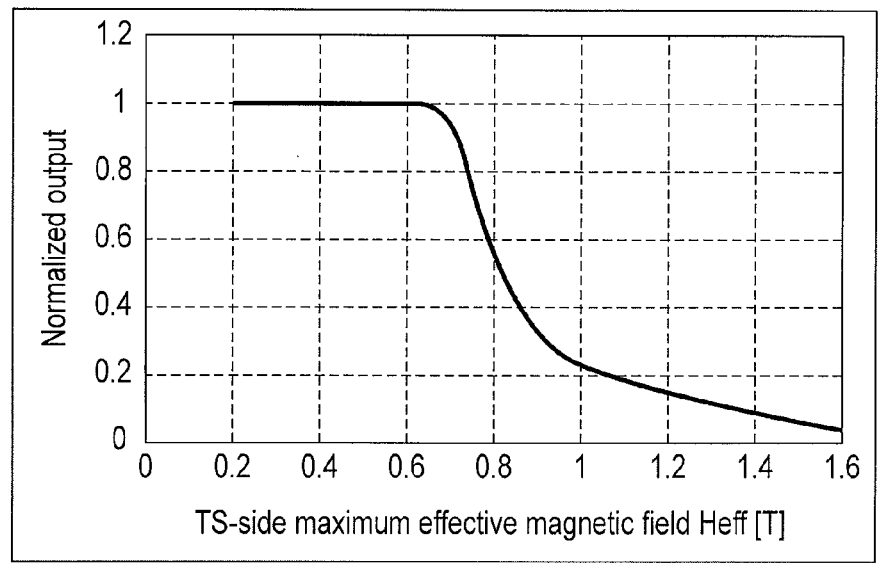
FIG. 11 is a graph showing the relationship between a trailing-shield (TS)-side peak effective magnetic field Heff generated by the main magnetic pole and the normalized output.

FIG. 11 is a graph showing the relationship between the trailing-shield (TS)-side peak effective magnetic field generated by the main magnetic pole 60 and the normalized output. The leading-shield (LS)-side maximum effective magnetic field is set at 1.15 T or more so that saturated recording can be achieved on the LS side. The TS-side peak effective magnetic field increases, and the output decreases at 0.65 T or more. This is because the recorded bits saturated on the TS side are disturbed by the LS-side effective magnetic field. The position where the TS-side peak effective magnetic field is generated is away from the spin torque oscillator 74, and almost no high-frequency magnetic field is applied thereto. Therefore, the TS-side peak effective magnetic field is equal to or less than the switch start magnetic field Hm of the MH curve of the recording medium so that stable recording is possible with no disturbance of the recorded bits of the saturated recording.

Figure 12:
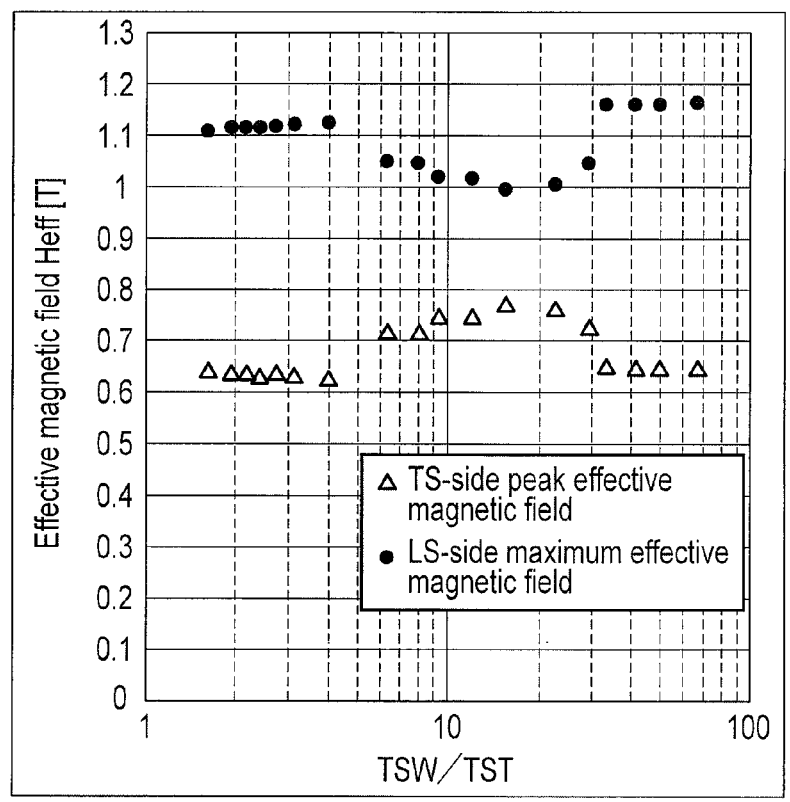
FIG. 12 is a graph showing the relationship between the ratio (TSW/TST) of the length TSW of the trailing shield (TS) in a core width direction to the length TST of the TS in the down track direction, the leading-shield (LS)-side maximum effective magnetic field, and the TS-side peak effective magnetic field.

FIG. 12 is a graph showing the relationship between the ratio (TSW/TST) of the length TSW of the trailing shield (TS) 62 in the core width direction to the length TST of the TS in the down track direction, the leading-shield (LS)-side maximum effective magnetic field, and the TS-side peak effective magnetic field. Here, the TSW is fluctuated within a given range of 1 to 25 μm. The TST is fluctuated within a given range of 0.24 to 1.24 μm. In accordance with such shapes, the magnetic field Heff is found. When the TSW/TST is 30 or more or is 5 or less, the LS-side maximum effective magnetic field can be 1.1 or more, and the TS-side peak effective magnetic field can be 0.65 T or less, so that stable recording is possible.

As the spin torque oscillator 74 is provided between the main magnetic pole 60 and the leading shield 64, the spin torque oscillator 74 is not subject to the write gap magnetic field. Thus, the write gap WG can be made smaller to increase the intensity of the write gap magnetic field, and recording density can be further improved.

In consequence, according to the present embodiment, it is possible to obtain a magnetic recording head and a disk drive comprising this magnetic recording head in which recording ability is improved, stable recording/reproduction characteristics can be obtained, and higher recording density can be obtained.

Now, HDDs according to other embodiments are described. In the other embodiments described below, the same components as those in the previously described first embodiment are provided with the same reference signs and are not described in detail. The differences between the other embodiments and the first embodiment are mainly described in detail.

(Second Embodiment)

FIG. 13 is a sectional view showing a head portion of a magnetic head of an HDD according to a second embodiment. FIG. 14 is an enlarged sectional view showing the magnetic-disk-side end of a magnetic recording head 58.

The magnetic recording head 58 comprises a leading shield 64, a spin torque oscillator 74 as a high-frequency oscillator, a main magnetic pole 60, and a trailing shield 62. In a track center, the leading shield 64, the spin torque oscillator 74, the main magnetic pole 60, and the trailing shield 62 are arranged in order from a leading side. According to the second embodiment, the trailing shield 62 has a distal end 62a that faces the trailing side of a distal end 60a of the main magnetic pole 60 across a write gap. The trailing shield 62 extends further upward from a disk-facing surface 43. The trailing shield 62 has a second connecting portion 62c joined to the back gap of the main magnetic pole 60 at a distance from a magnetic disk 12. The second connecting portion 62c is joined to the main magnetic pole 60 via a nonconducting layer, and is electrically insulated from the main magnetic pole 60 and the trailing shield 62 in the back gap. A second recording coil 72 of the magnetic recording head 58 is located to be wound around a magnetic circuit (magnetic core) that includes the main magnetic pole 60 and the trailing shield 62. The second recording coil 72 applies a magnetic field to this magnetic circuit.

In the second embodiment, the configuration of the magnetic recording head 58 is the same as that in the first embodiment described above in other respects.

Figure 15:
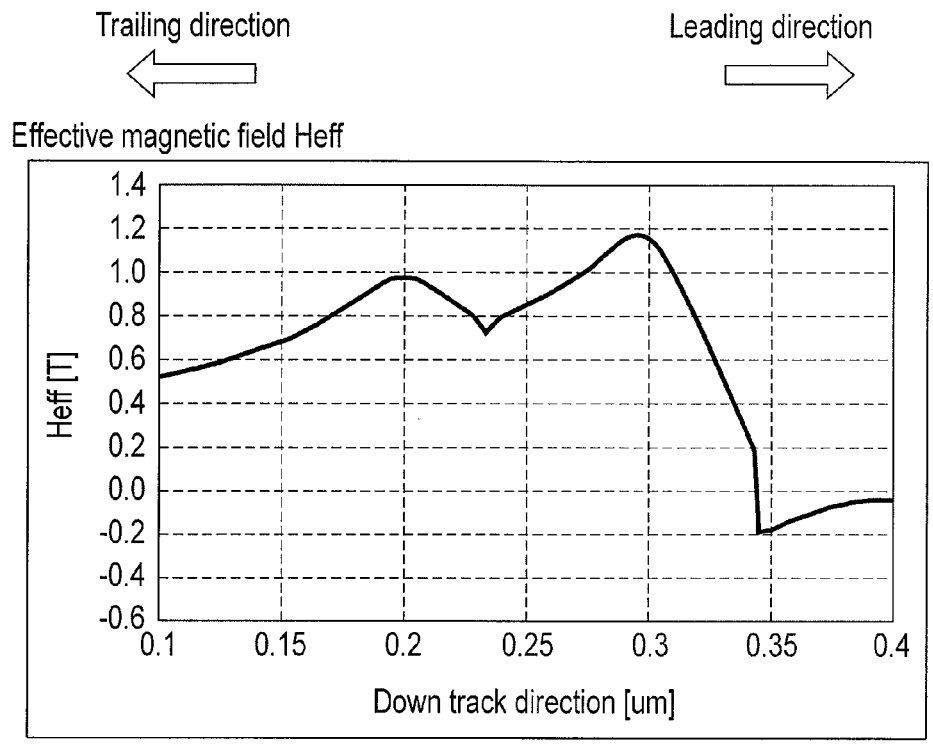
FIG. 15 is a graph showing the distribution of an effective magnetic field of the magnetic recording head in the down track direction.
Figure 16:
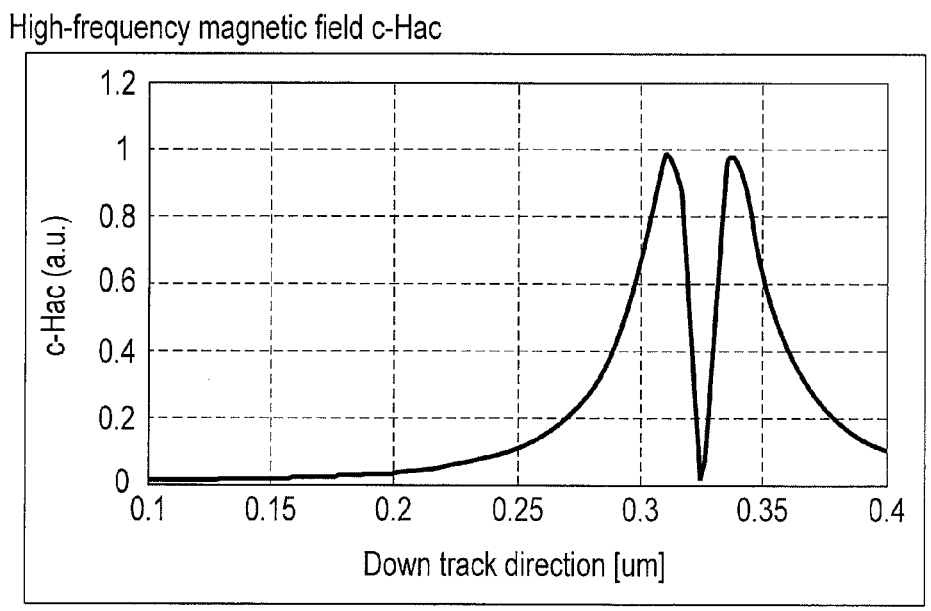
FIG. 16 is a graph showing a down-track-direction distribution of a high-frequency magnetic field c-Hac generated from a spin torque oscillator.

FIG. 15 shows the distribution of an effective magnetic field of the magnetic recording head 58 in the down track direction. FIG. 16 shows a down-track-direction distribution of a high-frequency magnetic field c-Hac generated from the spin torque oscillator 74. In the second embodiment, a leading-shield (LS)-side maximum effective magnetic field is superposed on the high-frequency magnetic field of the spin torque oscillator 74, and saturated recording of a recording medium is possible. The peak effective magnetic field on the side of the trailing shield (TS) 62 is greater than a switch start magnetic field Hm of the recording medium, but is off the peak of the high-frequency magnetic field of the spin torque oscillator 74. Therefore, bits of the saturated recording are not disturbed. Thus, in the second embodiment as well, it is possible to obtain a magnetic recording head and a disk drive comprising this magnetic recording head in which recording ability is improved, stable recording/reproduction characteristics can be obtained, and higher recording density can be obtained.

The back gap of the main magnetic pole 60 and the second joint 62c may be joined to the main magnetic pole 60 via a conductor. In this case, the same material can be used for the trailing shield 62 and the second joint 62c, the efficiency of the magnetic circuit of the main magnetic pole 60 and the trailing shield 62 is enhanced, and a greater recording magnetic field can be generated.

(Third Embodiment)

Figure 18:
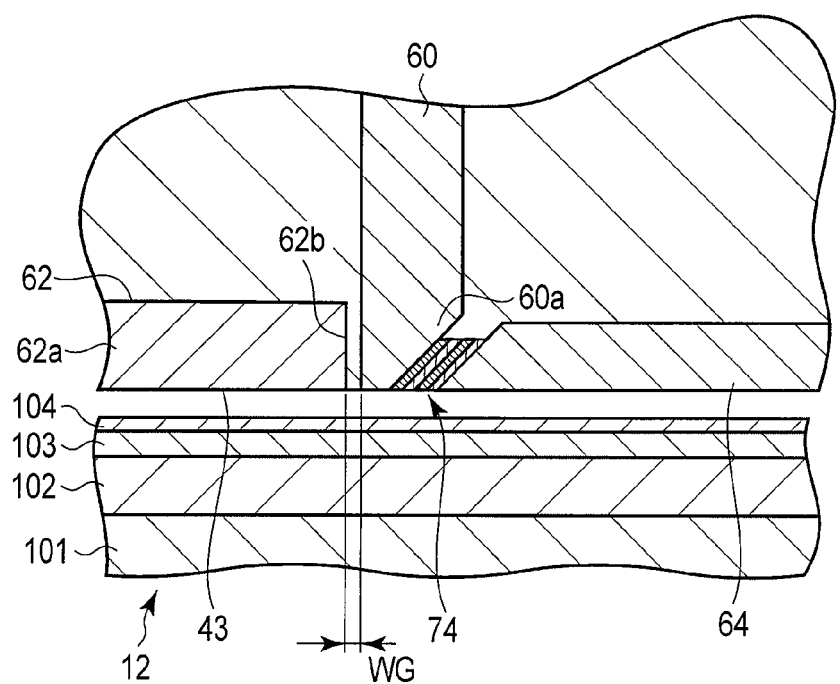
FIG. 18 is an enlarged sectional view showing the magnetic-disk-side end of a magnetic recording head according to the third embodiment.

FIG. 17 is a sectional view showing a head portion of a magnetic head of an HDD according to a third embodiment. FIG. 18 is an enlarged sectional view showing the magnetic-disk-side end of a magnetic recording head 58.

The magnetic recording head 58 comprises a leading shield 64, a spin torque oscillator 74 as a high-frequency oscillator, a main magnetic pole 60, and a trailing shield 62. In a track center, the leading shield 64, the spin torque oscillator 74, the main magnetic pole 60, and the trailing shield 62 are arranged in order from a leading side.

The trailing shield 62 has a distal end 62a that faces the trailing side of a distal end 60a of the main magnetic pole 60 across a write gap. The trailing shield 62 extends further upward from a disk-facing surface 43. The trailing shield 62 has a second connecting portion 62c joined to the back gap of the main magnetic pole 60 at a distance from a magnetic disk 12. The second connecting portion 62c is joined to the main magnetic pole 60 via a nonconducting layer, and is electrically insulated from the main magnetic pole 60 and the trailing shield 62 in the back gap. A second recording coil 72 of the magnetic recording head 58 is located to be wound around a magnetic circuit (magnetic core) that includes the main magnetic pole 60 and the trailing shield 62. The second recording coil 72 applies a magnetic field to this magnetic circuit.

In the third embodiment, the leading shield 64 is only provided in the vicinity of the disk-facing surface 43, and faces the leading side of the distal end 60a of the main magnetic pole 60 across a gap. In the disk-facing surface 43, the spin torque oscillator 74 is provided between the distal end 60a of the main magnetic pole 60 and the leading shield 64. The configuration of the magnetic recording head 58 is the same as those in the first and second embodiments described above in other respects.

FIG. 19 shows the distribution of an effective magnetic field of the magnetic recording head 58 in the down track direction. FIG. 20 shows a down-track-direction distribution of a high-frequency magnetic field c-Hac generated from the spin torque oscillator 74. In the third embodiment, a leading-shield (LS)-side maximum effective magnetic field is 1.3 T or more, and is superposed on the peak of the high-frequency magnetic field of the spin torque oscillator 74, so that saturated recording of a recording medium is possible. The effective magnetic field on the side of the trailing shield (TS) 62 sharply decreases, and is off the peak of the high-frequency magnetic field of the spin torque oscillator 74. Therefore, bits of the saturated recording are not disturbed by the effective magnetic field on the side of the trailing shield (TS) 62.

Thus, in the third embodiment as well, it is possible to obtain a magnetic recording head and a disk drive comprising this magnetic recording head in which recording ability is improved, stable recording/reproduction characteristics can be obtained, and higher recording density can be obtained.

The back gap of the main magnetic pole 60 and the second joint 62c may be joined to the main magnetic pole 60 via a conductor. In this case, the same material can be used for the trailing shield 62 and the second joint 62c, the efficiency of the magnetic circuit of the main magnetic pole 60 and the trailing shield 62 is enhanced, and a greater recording magnetic field can be generated.

(Fourth Embodiment)

Figure 21:
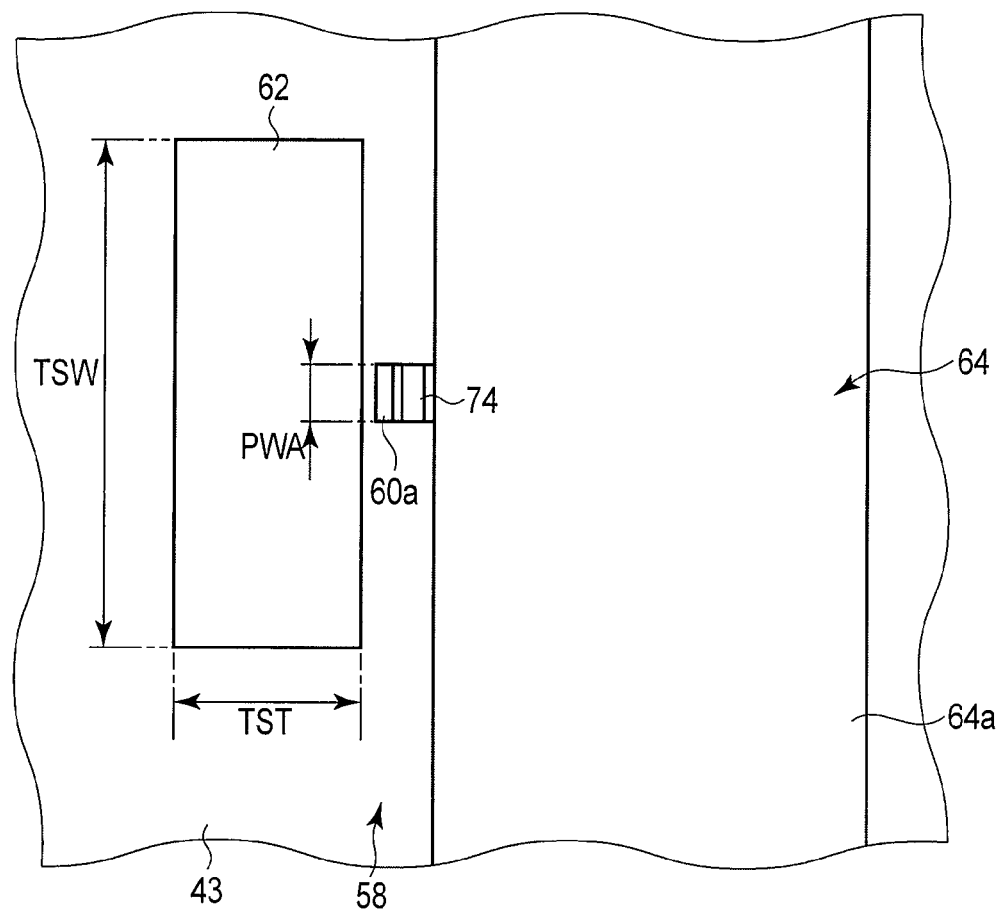
FIG. 21 is a plan view showing a head portion of a magnetic head of an HDD according to a fourth embodiment from the side of a disk-facing surface.

FIG. 21 is a plan view showing a head portion of a magnetic head of an HDD according to a fourth embodiment from the side of a disk-facing surface. According to the present embodiment, a magnetic recording head 58 comprises a leading shield 64, a spin torque oscillator 74 as a high-frequency oscillator, a main magnetic pole 60, and a trailing shield 62, as in the first embodiment. In a track center, the leading shield 64, the spin torque oscillator 74, the main magnetic pole 60, and the trailing shield 62 are arranged in order from a leading side.

In the embodiment, the length TST of the trailing shield (TS) in the down track direction is 0.64 µm. The length TSW of the TS in a core width direction is changed within a given range of 1 to 25 µm. The size PWA of the main magnetic pole 60 in the core width direction (track width direction) is changed within a given range of 0.3 to 0.6 µm. In accordance with such shapes, an effective magnetic field Heff of the magnetic recording head 58 is found.

Figure 22:
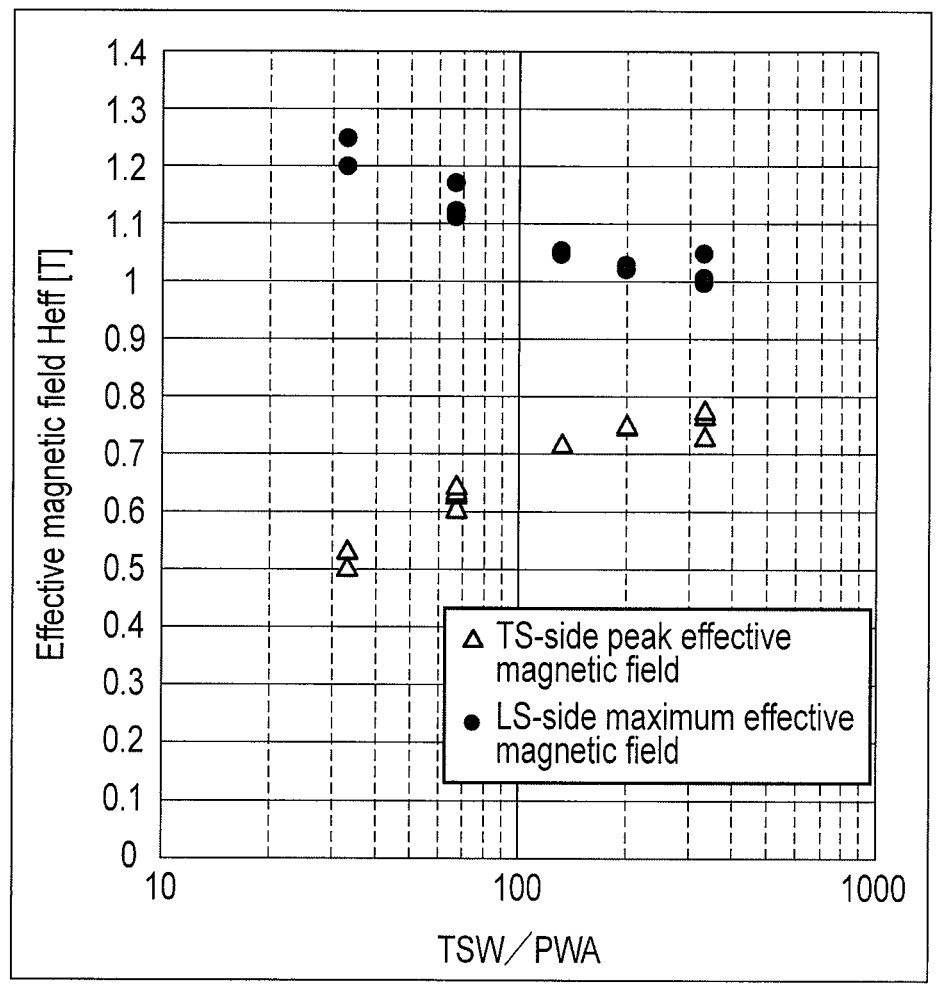
FIG. 22 is a graph showing the relationship between the ratio (TSW/PWA) of the length TSW of a trailing shield of a recording head according to the fourth embodiment in a core width direction to the length PWA of a main magnetic pole in the core width direction, and an effective magnetic field Heff.

FIG. 22 is a graph showing the relationship between the ratio (TSW/PWA) of the TSW of the magnetic recording head 58 according to the embodiment to the PWA, and the effective magnetic field Heff. The ratio (TSW/PWA) of the TSW to the PWA is 80 or less, so that the TS-side maximum effective magnetic field can be 1.1 or more, and the leading-shield (LS)-side peak effective magnetic field can be 0.65 T or less. Consequently, stable magnetic recording is possible.

(Fifth Embodiment)

FIG. 23 is a plan view showing a head portion of a magnetic head of an HDD according to a fifth embodiment from the side of a disk-facing surface. As in the first embodiment, a magnetic recording head 58 comprises a leading shield 64, a spin torque oscillator 74 as a high-frequency oscillator, a main magnetic pole 60, and a trailing shield 62. In a track center, the leading shield 64, the spin torque oscillator 74, the main magnetic pole 60, and the trailing shield 62 are arranged in order from a leading side.

According to the present embodiment, the magnetic recording head 58 comprises a pair of side shields 78. The side shields 78 are magnetically isolated from the main magnetic pole 60 on a disk-facing surface 43 on both sides of the track width direction of the main magnetic pole 60. The side shields 78 are arranged to be joined to the trailing shield 62. The side shields 78 are joined to the leading shield 64.

In the present embodiment, the length TSW of the trailing shield (TS) 62 in a core width direction is 10 µm. The TS and the leading shield (LS) are connected to each other via the side shields 78 to form a full side shield configuration. The throat height of the TS 62 is changed within a given range of 0.05 to 0.3 µm. The length PT of the main magnetic pole 60 in a down track direction is changed within a given range of 0.02 to 0.04 µm. The length TST of the TS 62 in the down track direction is changed within a given range of 0.2 to 0.7 µm. In accordance with such shapes, an effective magnetic field Heff is found.

FIG. 24 is a graph showing the relationship between the ratio TST/PT of the magnetic recording head according to the embodiment, and the effective magnetic field Heff. The ratio (TSW/PT) of the TST to the PT is 8 or less, so that the maximum effective magnetic field on the side of the TS 62 can be 1.1 T or more, and the peak effective magnetic field on the side of the LS 64 can be 0.65 T or less. Consequently, stable magnetic recording is possible.

In the present embodiment, the leading shield 64 and the trailing shield 62 are connected to each other by the side shields 78 to form the full side shield configuration. However, similar advantages can be obtained by a side shield configuration in which one of the TS and the LS extends forward in an adjacent track direction of the main magnetic pole 60.

The size TSW of the trailing shield 62 in the core width direction may be equal to or more than the length of the leading shield 64 in the core width direction. In this case, the magnetic domain structures of the trailing shield 62 and the leading shield 64 are stabilized, and recorded bits of the adjacent track are not disturbed. Thus, stable recording is possible.

The length of the side shield 78 in the core width direction may be equal to or more than the length of the leading shield 64 in the core width direction. In this case, the magnetic domain structures of the side shield 78 and the leading shield 64 are stabilized, and recorded bits of the adjacent track are not disturbed. Thus, stable recording is possible. The length of the side shield 78 in the core width direction may be equal to or more than the length of the trailing shield 62 in the core width direction. In this case, the magnetic domain structures of the side shield 78 and the trailing shield 62 are stabilized, and recorded bits of the adjacent track are not disturbed. Thus, stable recording is possible.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the materials, shapes, and sizes of the elements that constitute the head portion can be changed when necessary. In the magnetic disk drive, the number of magnetic disks and magnetic heads can be increased when necessary. Various sizes of the magnetic disk can be selected.

What is claimed is:

1. A magnetic recording head comprising:
a disk-facing surface configured to face a recording layer of a recording medium;
a main magnetic pole comprising a distal end located on the disk-facing surface and configured to apply a recording magnetic field to the recording layer of the recording medium;
a leading shield on a leading side of the main magnetic pole, opposed to the distal end of the main magnetic pole across a gap;
a high-frequency oscillator between the leading shield and the distal end of the main magnetic pole;
a recording coil configured to excite the main magnetic pole with a magnetic field; and
a trailing shield opposed to a trailing side of the distal end of the main magnetic pole across a write gap;
wherein a width of the trailing shield in a track width direction is smaller than that of the leading shield.

2. The magnetic head of claim 1, wherein the leading shield comprises a distal on the leading side of the magnetic pole, opposed to the distal end of the magnetic pole across a gap, and a connecting portion connected to a part of the main magnetic pole located apart from the disk-facing surface, and the leading shield forms a magnetic core together with the main magnetic pole.

3. The magnetic head of claim 2, wherein the connecting portion comprises a nonconductor.

4. The magnetic head of claim 3, wherein a ratio of length TSW of a part of the trailing shield facing the distal end of the main magnetic pole in a track width direction to a length TST of the trailing shield in the disk-facing surface in a down track direction is configured to be $5 \geq TSW/TST$ or $TSW/TST \geq 30$.

5. The magnetic head of claim 4, wherein the trailing shield comprises a connecting portion connected to a part of the main magnetic pole located apart from the disk-facing surface.

6. The magnetic head of claim 3, wherein a ratio of a length TSW of the part of the trailing shield facing the distal end of the main magnetic pole in a track width direction to a core width PWA of the main magnetic pole in the disk-facing surface in the track width direction is configured to be $TSW/PWA \leq 80$.

7. The magnetic head of claim 3, wherein a ratio of a length TST of the trailing shield in the disk-facing surface in a down track direction to a length PT of the main magnetic pole in the disk-facing surface in the down track direction is configured to be $TST/PT \geq 8$.

8. The magnetic head of claim 1, wherein a ratio of a length TSW of a part of the trailing shield facing the distal end of the main magnetic pole in a track width direction to a length TST of the trailing shield in the disk-facing surface in a down track direction is configured to be $5 \geq TSW/TST$ or $TSW/TST \geq 30$.

9. The magnetic head of claim 8, wherein the trailing shield comprises a connecting portion connected to a part of the main magnetic pole located apart from the disk-facing surface.

10. The magnetic head of claim 1, wherein a ratio of a length TSW of the part of the trailing shield facing the distal end of the main magnetic pole in a track width direction to a core width PWA of the main magnetic pole in the disk-facing surface in the track width direction is configured to be $TSW/PWA \leq 80$.

11. The magnetic head of claim 1, wherein a ratio of a length TST of the trailing shield in the disk-facing surface in a down track direction to a length PT of the main magnetic pole in the disk-facing surface in the down track direction is configured to be $TST/PT \geq 8$.

12. The magnetic head of claim 1, further comprising a pair of side shields on both sides of the track width direction of the main magnetic pole, magnetically isolated from the main magnetic pole on the disk-facing surface.

13. The magnetic head of claim 12, wherein the side shields are joined to at least one of the leading shield and the trailing shield.

14. The magnetic head of claim 1, further comprising a connection terminal configured terminal configured to pass current through the main magnetic pole, the high-frequency oscillator, and the leading shield.

15. A disk drive comprising:
a recording medium comprising a magnetic recording layer which comprises magnetic anisotropy perpendicular to a medium surface;
a drive unit configured to rotate the recording medium; and
the magnetic recording head of claim 1 configured to process information in the recording medium.

* * * * *